UNITED STATES PATENT OFFICE.

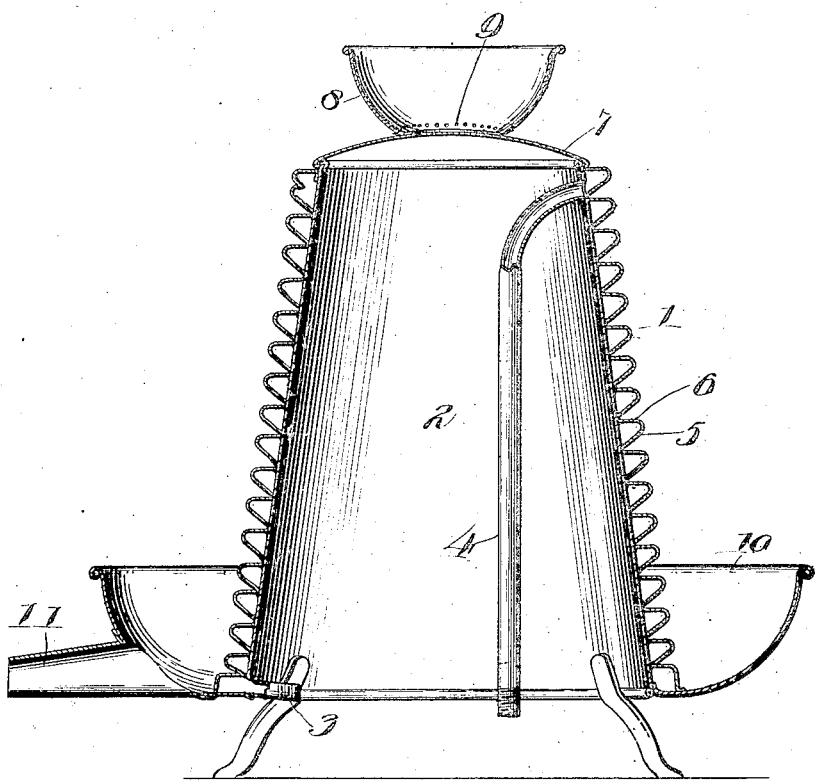

CHARLES SKIDD, OF KENOSHA, WISCONSIN.

MILK COOLER AND AERATOR.

No. 888,043.    Specification of Letters Patent.    Patented May 19, 1908.

Application filed July 19, 1907. Serial No. 384,517.

*To all whom it may concern:*

Be it known that I, CHARLES SKIDD, a citizen of the United States, residing at Kenosha, in the county of Kenosha and State of Wisconsin, have invented certain new and useful Improvements in Milk Coolers and Aerators, of which the following is a specification.

The object of my invention is to produce an improved apparatus for aerating, deodorizing and cooling warm milk or cream.

The accompanying drawing is a central sectional view of an apparatus embodying my invention.

The embodiment herein shown of my invention essentially consists in a conical cooling surface 1. In this instance the said cooling surface is composed of tubing arranged in a helical coil upon the outside of a shell or structure 2 which has the form of a conic frustum. The lower end of the helical coil is provided with an inlet 3, and the upper end of said coil with an outlet 4. The said coil consists in the present instance of a U-shaped sheet metal channel 5 securely fixed to the structure 2 by any suitable means, the upper side 6 of the U preferably lying nearly horizontal so as to form a shelf down which the milk may flow around the helix.

It is obvious that ordinary tubing may be employed, and that if the turns of the helix were arranged close enough together to prevent the passage of milk between said turns the structure 2 could be omitted.

A slightly rounded cover 7 is provided to fit over the upper end of the structure 2 and preferably is made removable. Attached to said cover is a basin 8 in the lower portion of whose sides are perforations 9 adapted to spread the milk evenly over said cover, whence it runs onto the turns of the cooling coil.

To the base of the structure 2 is attached an annular trough 10 provided with an outlet 11 and adapted to receive the milk from the cooling surface 1.

In use water or any other suitable cooling medium is passed through the cooling coil by connecting the inlet 3 with a suitable source of supply. When the water has begun to circulate freely through said coil and the surface is sufficiently chilled the warm milk is poured into the basin 8. As the milk flows through the perforations 9 and onto the cover 7, it spreads out in a thin layer and runs onto the uppermost turn of the cooling coil. From here some of the milk will gradually run down and around the upper side of the helical tube 5, and some of the milk will drip from one turn of the coil to the next. When the milk has reached the lower turns of said coil it will have been thoroughly aerated and deodorized, and its temperature will have been reduced to about one degree above that of the cooling medium.

As it is possible to vary the construction of the apparatus herein described without departing from the spirit of my invention, I do not wish to be restricted or limited to the precise construction herein shown.

I claim as my invention:

1. In an apparatus for cooling and aerating milk or cream, in combination, a shell in the form of a conic frustum; a U-shape sheet-metal channel helically coiled upon and secured to the outer side of said shell, said shell closing said channel and forming one wall thereof; said channel providing a shelf along which the milk may flow downward around the shell, a trough secured to the lower end of said shell; an outlet pipe from the top coil of said channel; an inlet entering the lowest of said coils adjacent to the bottom wall of said trough and from within said shell; a removable cover for the upper end of said shell; and a basin attached to said cover and perforated to allow milk to spread evenly over said cover.

2. In an apparatus for cooling and aerating milk or cream, in combination, a shell in the form of a conic frustum; a U-shape sheet-metal channel helically coiled upon and secured to the outer side of said shell, said shell closing said channel and forming one wall thereof; a trough secured to the lower end of said shell; an outlet pipe from the top coil of said channel; and an inlet entering the lowest of said coils.

3. In an apparatus for cooling and aerating liquids, in combination, a vertical shell, and a strip having its longitudinal edges bent to form a channel and helically coiled upon and secured to the outer side of said shell, said shell closing said channel and forming one wall thereof, one flange of said strip being bent in a substantially horizontal plane whereby the strip will provide a spiral runway for the liquid to cause it to flow spirally around the outer wall of said shell.

CHARLES SKIDD.

Witnesses:
NELLIE E. LIPPERT,
W. R. FIRCHOW.